US 8,732,700 B2
May 20, 2014

(12) United States Patent
Ginzton et al.

(54) VIRTUALIZATION SYSTEM WITH A REMOTE PROXY

(75) Inventors: Matthew David Ginzton, San Francisco, CA (US); Jeremy Sugerman, Palo Alto, CA (US); Ramesh Dharan, San Francisco, CA (US)

(73) Assignee: VMware, Inc., Palo Alto, CA (US)

( * ) Notice: Subject to any disclaimer, the term of this patent is extended or adjusted under 35 U.S.C. 154(b) by 1118 days.

(21) Appl. No.: 12/337,732

(22) Filed: Dec. 18, 2008

(65) Prior Publication Data

US 2010/0162235 A1    Jun. 24, 2010

(51) Int. Cl.
G06F 9/455  (2006.01)
G06F 9/46   (2006.01)
G06F 15/173 (2006.01)

(52) U.S. Cl.
USPC ............... 718/1; 718/100; 718/102; 718/104; 709/223; 709/224; 709/226

(58) Field of Classification Search
None
See application file for complete search history.

(56) References Cited

U.S. PATENT DOCUMENTS 5,535,375 A * 7/1996  Eshel et al. ............... 703/27
5,996,026 A * 11/1999 Onodera et al. .......... 710/3
2005/0204126 A1 * 9/2005  Watson ................. 713/150
2007/0169005 A1 * 7/2007  Drepper ................ 717/131
2007/0260702 A1 * 11/2007 Richardson et al. ..... 709/217
2009/0094316 A1 * 4/2009  Chen et al. ............ 709/203
2009/0119664 A1 * 5/2009  Pike et al. ............. 718/1
2009/0125902 A1 * 5/2009  Ghosh et al. ........... 718/1
2009/0172820 A1 * 7/2009  Watson ................. 726/26
2010/0053435 A1 * 3/2010  Goziker et al. ........ 348/558
2010/0138744 A1 * 6/2010  Kamay et al. .......... 715/716

OTHER PUBLICATIONS

VMware Product Datasheet, "VMware Virtual Desktop Infrastructure (VDI): Deliver Virtual Desktops from the Data Center", VMware, Inc., Palo Alto, CA, 2 pages. URL: http://www.vmware.com/files/pdf/vdi_datasheet.pdf.

* cited by examiner

Primary Examiner — Charles Swift

(57) ABSTRACT

A remote proxy provides remote control to a virtualization system. The virtualization system includes a computer having virtualization software executing on the computer, and one or more virtual machines executing on the computer by way of the virtualization software, each of the virtual machines having a guest operating system. The remote proxy receives over a network connection a plurality of logical channels of a multi-channel remote control protocol at a first domain of a plurality of domains of the virtualization system. Each of the logical channels convey information corresponding to one of the domains. For each logical channel, the remote proxy identifies the corresponding domain. Further, for each of the logical channels corresponding to a domain other than the first domain, the remote proxy forwards the logical channel to the corresponding domain.

28 Claims, 3 Drawing Sheets

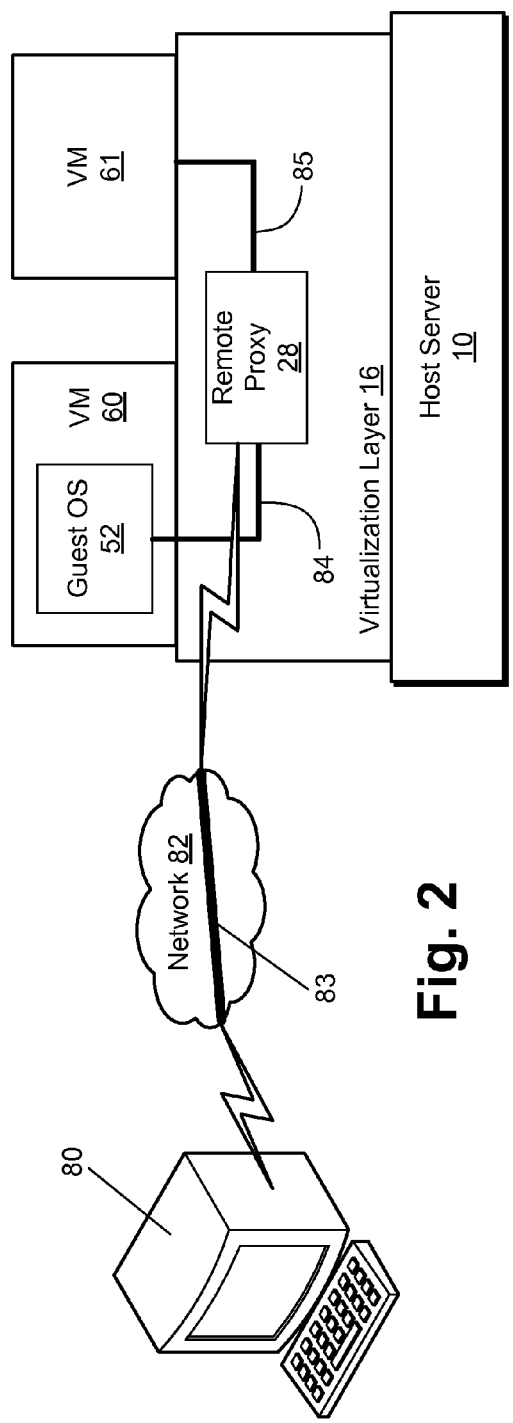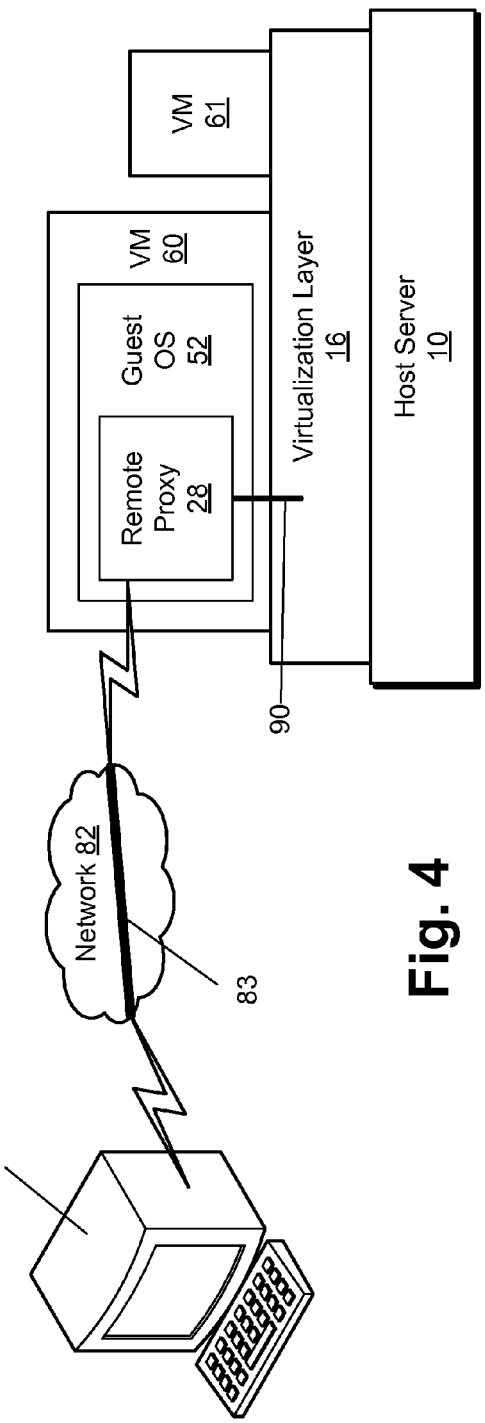

VIRTUALIZATION SYSTEM WITH A REMOTE PROXY

BACKGROUND INFORMATION

"Virtualization" generally describes the separation of a resource or request for a service from the underlying physical delivery of that service. With virtual memory, for example, computer software gains access to more memory than is physically installed, via the background swapping of data to disk storage. Similarly, virtualization techniques can be applied to other information technology infrastructure layers, including networks, storage, laptop or server hardware, operating systems, applications, etc.

This blend of virtualization technologies, or "virtual infrastructure", provides a layer of abstraction between computing, storage and networking hardware, and the applications running on it. The deployment of virtual infrastructure is typically non-disruptive, since the user experiences are largely unchanged. However, virtual infrastructure gives computer system administrators the ability to manage pooled resources across an enterprise, allowing them to be more responsive to dynamic organizational needs and to better leverage infrastructure investments.

SUMMARY OF THE INVENTION

One embodiment is a remote proxy that provides remote control to a virtualization system. The virtualization system includes a computer having virtualization software executing on the computer, and one or more virtual machines executing on the computer by way of the virtualization software, each of the virtual machines having a guest operating system. The remote proxy receives over a network connection a plurality of logical channels of a multi-channel remote control protocol at a first domain of a plurality of domains of the virtualization system. Each of the logical channels convey information corresponding to one of the domains. For each logical channel, the remote proxy identifies the corresponding domain. Further, for each of the logical channels corresponding to a domain other than the first domain, the remote proxy forwards the logical channel to the corresponding domain.

BRIEF DESCRIPTION OF THE DRAWINGS

FIG. 2 is a block diagram of the host server of FIG. 1 coupled to a remote client computer in accordance with one embodiment.

FIG. 4 is a block diagram of the host server of FIG. 1 coupled to the remote client computer in accordance with another embodiment.

DETAILED DESCRIPTION

One embodiment is a virtualization system that includes a remote proxy that functions as an end-point for a remote control network connection with multiplexed logical channels. The remote proxy can terminate a logical channel in a selected domain of the virtualization system such as the virtualization layer or virtual machine operating system, depending on the functionality of the logical channel.

Figure 1:
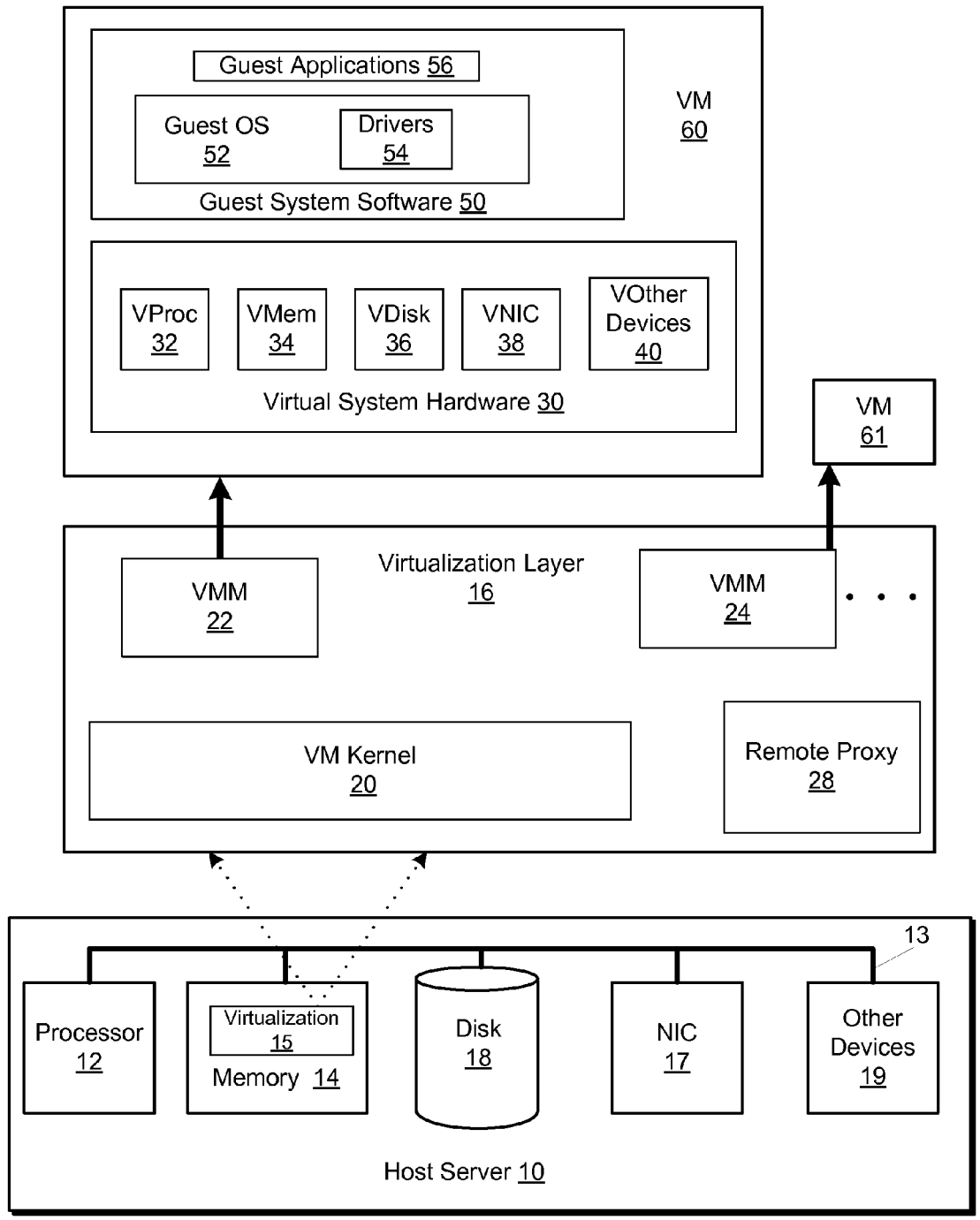
FIG. 1 is a block diagram of a host server that can implement one embodiment.

FIG. 1 is a block diagram of a host server ("host") 10 that can implement one embodiment. Host 10 includes a bus 13 or other communication mechanism for communicating information among the components of host 10. Host 10 further includes a processor 12 for processing information. Processor 12 may be any type of general or specific purpose processor. In one embodiment, processor 12 is an x86 architecture-based processor. Host 10 further includes a memory 14 for storing information and instructions to be executed by processor 12. Memory 14 can be comprised of any combination of random access memory ("RAM"), read only memory ("ROM"), or any other type of computer readable media. Computer readable media may be any available media that can be accessed by processor 12, and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Host 10 further includes a disk 18 which can be any type of static/non-volatile storage such as a magnetic or optical disk. Host 10 further includes a network interface card 17 or other type of communication device to provide access to a network. Therefore, a user may interface with host 10 directly, or remotely through a network. Finally, host 10 may include other devices 19 as required, such as user interface devices, universal serial bus ("USB") ports, etc.

In one embodiment, memory 14 stores software modules that provide functionality when executed by processor 12. In one embodiment, a virtualization module 15, when executed by processor 12, provides the functionality of a virtualization layer 16. Virtualization layer 16 includes a VM kernel 20 and one or more virtual machine monitors ("VMM"s) 22, 24. In one embodiment, virtualization layer 16 is the ESX Server from VMware, Inc. Virtualization layer 16, in general, is logically interposed between and interfaces with host 10 and all virtual machines hosted by host 10. Virtualization layer 16 further includes remote proxy module 28, which receives multiplexed virtual channels and terminates each channel in virtualization layer 16 or in a guest operating system, as disclosed in more detail below.

VM kernel 20 runs directly on the native hardware of host 10 and manages system resources. VM kernel 20 allows one or more VMs 60, 61 to run on host 10 and provides virtual partitioning capabilities between the VMs. VM kernel 20, for each VM on host 10, instantiates VMMs 22, 24. Each VMM 22, 24 monitors the execution of its corresponding VM 60, 61 and determines when its VM requires communication with a physical resource. The VMM may then do one of several things in response, including emulating the resource, providing direct access to the real resource, mediating indirect access to the real resource, or handing the communication to some other entity that emulates the resource. VM 60, as with the other VMs instantiated by VM kernel 20 such as VM 61, includes virtual system hardware 30. Virtual system hardware 30 includes virtual devices that are emulated by VMM 22. Therefore, virtual system hardware 30 is merely a representation of the execution environment of guest system software 50. In the example of FIG. 1, virtual system hardware 30 includes a virtual processor 32, a virtual memory 34, a virtual disk 36, a virtual NIC 38, and a virtual version of other devices 40.

VM 60 further includes guest system software 50 that includes a guest operating system ("OS") 52 and one or more guest applications 56. Guest OS 52 can be any type of commercially available OS, including a Windows-based OS from Microsoft Corp., Linux, Novell Netware, Sun Solaris, etc. Guest OS 52, while operating within VM 60 in one embodiment, requires no modifications to its "off-the-shelf" version that would run on a non-virtualized computer. In other embodiments, guest OS 52 may be modified from its off-the-shelf version, or "para-virtualized", to specifically run within VM 60. Guest OS 52 includes drivers 54 which can be the standard drivers of the OS. Guest applications 56 are any applications that can be executed with guest OS 52. As with guest OS 52, guest applications 56 typically do not need to be modified from their "off-the-shelf" versions to be executed within VM 60.

The embodiment of FIG. 1 may be considered "non-hosted" because virtualization layer 16 is installed directly on the hardware of host 10. In another embodiment, a host operating system such as a Windows OS is stored in memory 14 and directly executed by processor 12. In this embodiment, known as a "hosted" approach, virtualization layer 16 operates with the host operating system.

FIG. 2 is a block diagram of host 10 of FIG. 1 coupled to a remote client computer ("client") 80 in accordance with one embodiment. Client 80 can be any type of device that can access host 10 over a network connection to remotely control/monitor host 10 and/or any VMs hosted by host 10. Prior art protocols/products exist for remotely controlling a non-virtualized server via a client computer. For example Remote Desktop Protocol ("RDP") is a multi-channel protocol that allows a client to connect to a server that is running a Windows-based operating system and to remotely control/monitor the server. However, RDP and other known remote control protocols are optimized to remotely control a limited number of I/O devices on the server. Further, because these known protocols interface directly with the OS of the server, or an application running on the OS, they require a substantially well functioning support stack before they can be run (i.e., the OS must be alive and configured with an active network configuration). Therefore, it is not possible with these known protocols to troubleshoot an OS boot problem or network configuration problems.

Further, prior art hardware remote control devices provide lights-out management ("LOM") features that allow some non-network devices to be controlled over a network connection, but these devices do not allow integration between the hardware features and equivalent or overlapping features implemented in software (e.g., the OS) running on the hardware. With virtualization systems, known products can provide remote control of the virtualization layer. For example, "Remote Console" from VMware, Inc. allows a level of remote control of the virtualization layer that is functional even when a guest OS within a VM is misconfigured or malfunctioning. However, similar to the known hardware remote control devices, Remote Console for the virtualization layer does not allow integration with the functionality of other domains, such as authentication methods within a guest OS.

In comparison to non-virtualized systems, virtualization systems include a wider variety of functions that may be need to controlled and that may be only visible in one of the multiple domains (e.g., the virtualization layer domain, the VM domain, the guest OS domain, etc.). The functions that can be controlled include:

The guest OS [visible within the guest OS domain];
Processes running inside the guest OS [visible within the guest OS domain];
Virtual devices/hardware associated with an individual virtual machine [visible within the virtualization layer domain and the guest OS domain];
Virtualization layer functionality associated with the execution of an individual VM but not visible at the virtual hardware level (e.g., scheduling constraints, mapping of virtual resources to physical resource, etc.) [visible within the virtualization layer domain];
Virtualization layer functionality not associated with the execution of an individual VM (e.g., physical hardware configuration, VM deployment, VM co-deployment constraints, etc.) [visible within the virtualization layer domain].

In order to provide remote control for all of the above functions of a virtualization system using known protocols, it would likely be necessary for the client computer to have a separate network connection coupled directly to each domain, including a connection to at least each guest OS and the virtualization layer.

In contrast to known remote control protocols, embodiments disclosed herein allow client 80 to control/monitor the functionality of all domains of host 10 via a single network connection 83 over a network 82 such as the Internet. In one embodiment, connection 83 is coupled to remote proxy 28 which can be located in virtualization layer 16. Remote proxy 28 is coupled to guest OS 52 via a control channel 84 and can also be coupled to any or all additional VMs hosted by host 10. For example, another control channel 85 couples remote proxy 28 to VM 61. Therefore, client 80 can connect simultaneously to all the layered domains that affect one VM domain, or may also connect simultaneously to multiple VM domains. In one embodiment, control channels 84, 85 are a Virtual Machine Communication Interface ("VMCI"). In other embodiments, control channels 84, 85 can be any infrastructure that allows virtualization layer 16 to communicate with one or more VMs of host 10.

In one embodiment, a multi-channel remote control protocol is communicated over network connection 83. The protocol allows for separate virtual/logical channels for each function of host 10 that client 80 can control/monitor. In one embodiment, the multi-channel remote control protocol is RDP and it runs over Transmission Control Protocol ("TCP")/Internet Protocol ("IP") on network connection 83. In one embodiment, the multi-channel remote control protocol includes logical channels having control streams of data. The logical channels may carry, for example, presentation data, serial device communication, licensing information and encrypted data such as keyboard activity, mouse activity, data files, etc. In one embodiment, a logical channel exists for requesting or responding to requests for each of the following functions/services:

Authentication at the virtualization layer and/or at a guest OS;
Remote display, including the ability to appropriately represent and accelerate 2-dimensional, 3-dimensional and video functions, and minimize interactive latency via methods such as client-side mouse cursor and keyboard type-ahead processing;
Remote high-level input/output ("I/O") functions, such as audio and printing; and
Remote low-level I/O functions, such as USB storage and pass-through, CD-ROM and smart card.

Remote proxy 28 receives each of the logical channels from network connection 83, and terminates or forwards the channel in the appropriate and corresponding domain depending on the remote control functionality. For example, an OS authentication request should terminate on the guest OS, while a VM scheduling constraint should be terminated at the virtualization layer.

Figure 3:
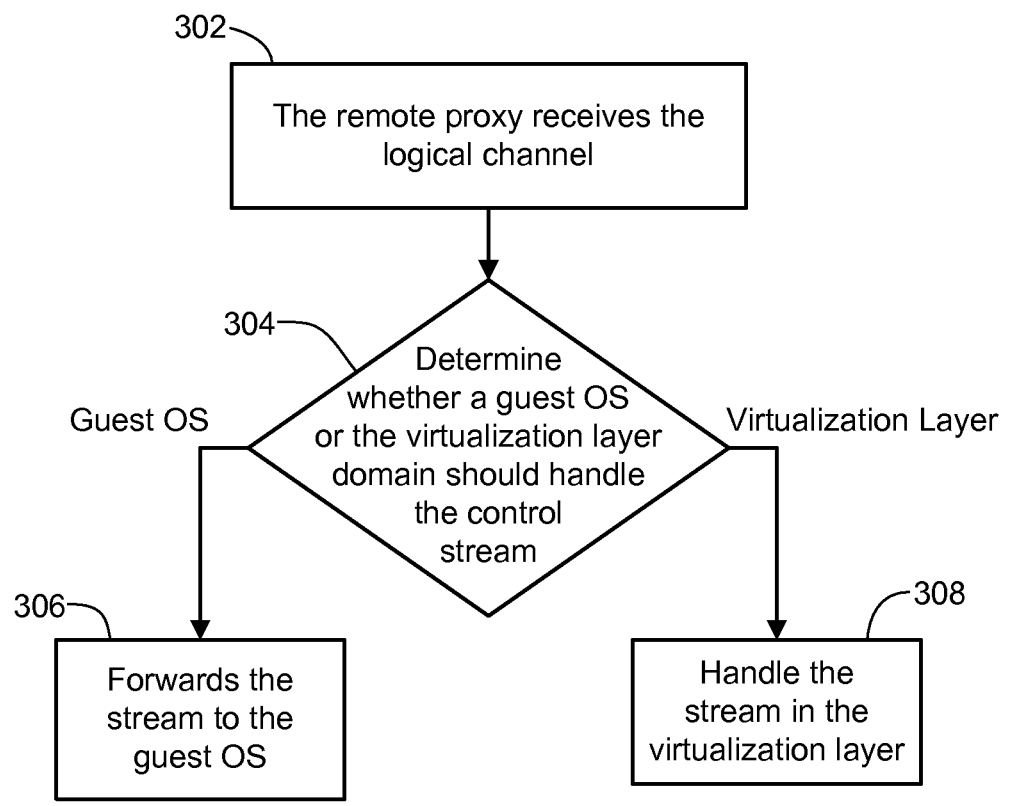
FIG. 3 is a flow diagram of the functionality of a remote proxy module in accordance with one embodiment.

FIG. 3 is a flow diagram of the functionality of remote proxy module 28 in accordance with one embodiment when it receives a logical channel from the interactive protocol on network connection 83. In one embodiment, the functionality of the flow diagram of FIG. 3 is implemented by software stored in memory or other computer readable or tangible media, and executed by a processor. In other embodiments, the functionality may be performed at least in part by hardware (e.g., through the use of an application specific integrated circuit ("ASIC"), a programmable gate array ("PGA"), a field programmable gate array ("FPGA"), etc.), or any combination of hardware and software.

At 302, remote proxy 28 receives one or more logical channels over network connection 83. Each logical channel conveys information corresponding to one of the domains of the virtualization system. In one embodiment, remote proxy 28 is located in VM kernel 20 of virtualization layer 16 or in another area within virtualization layer 16.

At 304, remote proxy 28 identifies/determines which domain should handle the logical channel—a guest OS or the virtualization layer or another domain. The determination in part is based on the functionality of the logical channel and which domain is responsible for that functionality. In other embodiments, the determination may be based on information embedded in the logical channel itself, user-configurable settings that determine the relationship between channel functions and the domain that should back that function, or whether the domain is ready to back the function (e.g., a display channel could go to the guest OS if its display server is available or be mapped to the virtualization layer if the display server is not available, such as during a boot-up or after a guest OS crash).

At 306, if the determined domain at 304 is a guest OS, remote proxy 28 forwards the logical channel to the guest OS or another domain.

At 308, if the determined domain at 304 is the virtualization layer, the logical channel is forwarded/remains in the virtualization layer (i.e., the domain where remote proxy 28 is located).

As an example of the functionality of FIG. 3, client 80 may require a first logical channel terminating in the virtualization layer to provide access to VM poweron/poweroff commands, a second logical channel at the virtualization layer to provide access to remote devices at the virtual hardware level, and multiple logical channels at the guest OS for authentication, remote display and interactive console. With the functionality of FIG. 3, remote proxy 28 can handle all of these logical channels via a single network connection and forward each logical channel to the appropriate domain.

Although remote proxy 28 of FIG. 2 is located in the virtualization layer, in another embodiment remote proxy 28 can be located in a guest OS of a VM (or in multiple VMs) and remote proxy 28 will forward the service to the virtualization layer or other domain when necessary. FIG. 4 is a block diagram of host 10 of FIG. 1 coupled to remote client computer 80 in accordance with such an embodiment. As shown, remote proxy 28 is located within guest OS 52 and is coupled to virtualization layer 16 via a control channel 90. In another embodiment, remote proxy 28 may switch between domains depending on the circumstances. For example, when host 10 is booting up, remote proxy 28 can be located in the virtualization layer, and when a guest OS has successfully booted, remote proxy 28 may be moved to the guest OS. In general, remote proxy 28 can be located in any address space available in host 10, including in the kernel, in service partitions provided by the kernel, in a VM, or spread across multiple VMs. In another embodiment, remote proxy 28 may remain in one domain, but the backing for a given channel may move between domains (i.e., from a "previous" domain to a "current" domain) depending on the circumstances.

Further, in other embodiments remote proxy 28 may preemptively handle a virtual channel request itself rather than forwarding it to a domain. Further, remote proxy 28 may modify/translate the request before forwarding it to a domain, or may modify a response to the request from a domain before sending the response to client 80. As an example, the virtual hardware may support remote control via the Virtual Network Computing ("VNC") protocol, and the guest OS may supports remote control via the RDP protocol. In one embodiment, remote proxy 28 can enable a client to connect for remote control at all times, even when the guest OS is not running. If the client is using RDP, proxy 28 can specify support for the RDP protocol, and incoming RDP connections can go straight to the guest OS when it is running. When the guest OS is not running, proxy 28 will translate incoming RDP requests to VNC protocol, pass them to the virtualization layer's VNC server, receive the responses, translate the responses back to RDP, and send RDP responses to the client. In another example, proxy 28 could also insert/delete/remap keystrokes or mouse clicks for the input control stream, or show different borders or colors in the display output stream depending on which domain is communicates with, or could add cross-domain controls, such as expanding the virtual screen to make room for a toolbar with power buttons, then interpreting clicks on the power buttons as actions applying to the virtualization layer, even though the rest of the screen is drawn by the guest OS. In another embodiment, remote proxy 28 may forward virtual channels to various domains, such as a VM and virtualization layer, and then combine responses from the domains into a single response that is sent to client 80.

As disclosed, logical channels in a single network connection are coupled to a remote proxy in a virtualization system. Some of the logical channels are forwarded to a guest OS and some are forwarded to the virtualization layer or other domains, depending on the functionality of the logical channel.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A method of providing remote control to a virtualization system, the virtualization system comprising a computer having virtualization software executing on the computer and one or more virtual machines executing on the computer by way of the virtualization software, each of the virtual machines having a guest operating system, the method comprising:

receiving over a network connection a plurality of logical channels of a multi-channel remote control protocol at a first domain of a plurality of domains of the virtualization system, each of the logical channels conveying information corresponding to one of the domains for controlling a function in one of the domains via a remote client;

for each logical channel, identifying the corresponding domain;

for each of the logical channels corresponding to a domain other than the first domain, forwarding the information conveyed in the logical channel to the corresponding domain for controlling the function in the corresponding domain; and for the logical channel corresponding to the first domain, processing information conveyed in the logical channel in the first domain to apply the function in the first domain, wherein the first domain is a virtual machine domain of the one or more of the virtual machines and the corresponding domain is a virtualization layer domain.

2. The method of claim 1, wherein:

the first domain is the virtualization layer domain and the corresponding domain is the virtual machine domain, and the first domain changes to the virtual machine domain and the corresponding domain changes to the virtualization layer domain.

3. The method of claim 1, wherein:

the virtual machine domain includes a guest operating system domain, and the first domain is the guest operating system domain.

4. The method of claim 1, wherein the network connection is coupled to a remote client computer.

5. The method of claim 1, wherein the network connection is a Transmission Control Protocol/Internet Protocol connection.

6. The method of claim 1, wherein one of the logical channels conveys information having functionality comprising one of: authentication, remote display and remote input/output functions.

7. The method of claim 1, wherein the identifying is based on a functionality of the logical channel.

8. The method of claim 1, wherein the information is modified before the information conveyed in the logical channel is forwarded to the corresponding domain.

9. The method of claim 1, further comprising receiving one or more responses from the corresponding one or more domains in response to the information conveyed in the logical channels and forwarding the responses to the remote client.

10. The method of claim 1, wherein the first domain changes from the virtual machine domain to the virtualization layer domain and the corresponding domain changes from the virtualization layer domain to the virtual machine domain.

11. The method of claim 1, wherein the function in each corresponding domain is only controllable from that corresponding domain.

12. The method of claim 1, wherein a backing for one of the logical channels moves from the first domain to the corresponding domain.

13. A non-transitory computer readable storage media having instructions stored thereon that, when executed by a processor, causes the processor to provide remote control to a virtualization system, the virtualization system comprising a computer having virtualization software executing on the computer and one or more virtual machines executing on the computer by way of the virtualization software, each of the virtual machines having a guest operating system, the processor comprising:

receiving over a network connection a plurality of logical channels of a multi-channel remote control protocol at a first domain of a plurality of domains of the virtualization system, each of the logical channels conveying information corresponding to one of the domains for controlling a function in one of the domains via a remote client;

for each logical channel, identifying the corresponding domain;

for each of the logical channels corresponding to a domain other than the first domain, forwarding the information conveyed in the logical channel to the corresponding domain for controlling the function in the corresponding domain; and for the logical channel corresponding to the first domain, processing information conveyed in the logical channel in the first domain to apply the function in the first domain, wherein the first domain is a virtual machine domain of the one or more of the virtual machines and the corresponding domain is a virtualization layer domain.

14. The non-transitory computer readable storage media of claim 13, wherein:

the first domain is the virtualization layer domain and the corresponding domain is the virtual machine domain, and the first domain changes to the virtual machine domain and the corresponding domain changes to the virtualization layer domain.

15. The non-transitory computer readable storage media of claim 13, wherein:

the virtual machine domain includes a guest operating system domain, and the first domain is the guest operating system domain.

16. The non-transitory computer readable storage media of claim 13, wherein the network connection is coupled to a remote client computer.

17. The non-transitory computer readable storage media of claim 13, wherein the network connection is a Transmission Control Protocol/Internet Protocol connection.

18. The non-transitory computer readable storage media of claim 13, wherein one of the logical channels conveys information having functionality comprising one of: authentication, remote display and remote input/output functions.

19. The non-transitory computer readable storage media of claim 13, wherein the identifying is based on a functionality of the logical channel.

20. The non-transitory computer readable storage media of claim 13, wherein the information is modified before the information conveyed in the logical channel is forwarded to the corresponding domain.

21. The non-transitory computer readable storage media of claim 13, further comprising receiving one or more responses from the corresponding one or more domains in response to the information conveyed in the logical channels and forwarding the responses to the remote client.

22. The non-transitory computer readable storage media of claim 13, wherein the first domain changes from the virtual machine domain to the virtualization layer domain and the corresponding domain changes from the virtualization layer domain to the virtual machine domain.

23. The non-transitory computer readable storage media of claim 13, wherein a backing for one of the logical channels moves from the first domain to the corresponding domain.

24. A system for providing remote control to a virtualization system, the virtualization system comprising a computer having virtualization software executing on the computer, the system comprising:

a virtualization layer that comprises a kernel and a virtual machine monitor;

at least one virtual machine that comprises a guest operating system; and a replay proxy located in a first domain of a plurality of domains and coupled to a network connection that comprises at least one logical channel of a multi-channel remote control protocol, the at least one logical channel conveying information corresponding to at least one of the domains, wherein the at least one logical channel conveying information corresponding to one of the domains for controlling a function in one of the domains via a remote client;

wherein the replay proxy is adapted to receive over the network connection the at least one logical channel, determine the corresponding domain for the at least one logical channel, and forward the information conveyed in the at least one logical channel to the corresponding domain if the at least one logical channel corresponds to a domain other than the first domain, and process information conveyed in the at least one logical channel in the first domain to apply the function in the first domain if the at least one logical channel corresponds to the first domain, wherein the first domain is a virtual machine domain of the one or more of the virtual machines and the corresponding domain is a virtualization layer domain.

25. The system of claim 24, wherein:

the first domain is the virtualization layer domain and the corresponding domain is the virtual machine domain, and the first domain changes to the virtual machine domain and the corresponding domain changes to the virtualization layer domain.

26. The system of claim 24, wherein:

the virtual machine domain includes a guest operating system domain, and the first domain is the guest operating system domain.

27. The system of claim 24, wherein the information conveyed in the at least one logical channel provides functionality comprising one of: authentication, remote display and remote input/output functions.

28. A system for providing remote control to a virtualization system, the virtualization system comprising a computer having virtualization software executing on the computer and one or more virtual machines executing on the computer by way of the virtualization software, each of the virtual machines having a guest operating system, the system comprising:

a non-transitory computer-readable storage medium comprising instructions, that when executed, control the computer to be configured for:

receiving over a network connection a plurality of logical channels of a multi-channel remote control protocol at a first domain of a plurality of domains of the virtualization system, each of the logical channels conveying information corresponding to one of the domains for controlling a function in one of the domains via a remote client;

for each logical channel, identifying the corresponding domain;

for each of the logical channels corresponding to a domain other than the first domain, forwarding the information conveyed in the logical channel to the corresponding domain for controlling the function in the corresponding domain; and for the logical channel corresponding to the first domain, processing information conveyed in the logical channel in the first domain to apply the function in the first domain, wherein the first domain is a virtual machine domain of the one or more of the virtual machines and the corresponding domain is a virtualization layer domain.

\* \* \* \* \*